United States Patent [19]

Kitamura et al.

[11] Patent Number: 5,035,499

[45] Date of Patent: Jul. 30, 1991

[54] SPECTACLES

[75] Inventors: Kanji Kitamura; Shuichi Kawamoto, both of Osaka, Japan

[73] Assignees: Hokushin Corporation, Yao; Kawamoto Optical Industrial Company Limited, Osaka, both of Japan

[21] Appl. No.: 537,440

[22] Filed: Jun. 13, 1990

[30] Foreign Application Priority Data

Dec. 15, 1989 [JP] Japan ............................. 1-145190[U]

[51] Int. Cl.5 .......................... G02C 5/14; G02C 5/22
[52] U.S. Cl. .................................... 351/153; 351/121
[58] Field of Search ....................... 351/121, 153, 111; 16/228

[56] References Cited

U.S. PATENT DOCUMENTS 4,699,479  10/1987  Metcalfe .............................. 351/153

Primary Examiner—Rodney B. Bovernick
Attorney, Agent, or Firm—Trexler, Bushnell, Giangiorgi & Blackstone, Ltd.

[57] ABSTRACT

Spectacles having a lens frame corner and an engaging arm end. The lens frame corner includes a parallelepiped block extending from the lens frame and having a top and a bottom surfaces. Each of the top and bottom surfaces of the block has a recess or a hole, a first groove having a semicircular section, and a second groove having a semicircular section at right angle with the first grooves. The arm end include a pair of parallel planar strips. The distance between the upper strip and the lower strip is such that it allows forcible insertion of the block of the frame corner. Each of the strip has a cylindrical projection facing each other which, in use, is inserted into the recess or the hole of the block and a linear projection having a semicircular section, which, in use, is inserted into one of the grooves of the block.

3 Claims, 2 Drawing Sheets

SPECTACLES

BACKGROUND OF INVENTION

The present invention relates to spectacles, more specifically spectacles with a connection having no screw between a lens frame and an arm.

A connection having no screw between the two parts is known from U.S. Pat. No. 4,730,915, for instance. As shown in FIG. 6a of this U.S. patent, each of the two arms has openings in a flange integral therewith, and each end of the lens frames has a trunnion and a tongue integral therewith. These elements are of molded plastic construction and designed to forcibly interfit, and to allow forcible "pull away", as during impact, for the safety of the wearer.

This construction is suitable for sunglasses having detachable components so that they may be easier to carry, assemble and disassemble, which the invention of the U.S. patent relates to. However, this is unsuitable for usual spectacles used everyday, because such a connection is too weak and imprecise.

A purpose of this invention is to provide a new connection having no screw between lens frame and an arm, yet almost as strong and precise as the usual connection with a screw.

SUMMARY OF THE INVENTION

The spectacles in accordance with the present invention include lens frames and two arms pivotally connected to the lens frames comprising a lens frame corner including a substantially parallelepiped block extending from the lens frame and having a top and a bottom surfaces, each of the top and bottom surfaces of said block having a recess or a hole, a first groove having a substantially semicircular section, and a second groove having a substantially semicircular section at right angle with the first grooves, and, an arm end including a pair of parallel planar strips, the distance between the upper strip and the lower strip being such that it allows forcible insertion of the block of the frame corner, each of the strip having a substantially cylindrical projection facing each other which, in use, is inserted into the recess or the hole of the block and a linear projection having a substantially semicircular section, which, in use, is inserted into one of the grooves of the block.

Preferably, the parallelepiped block has outer corners which are thickened compared with the flat top and bottom surfaces.

Preferably, each of the first and second grooves have a semicircular section which becomes deeper toward the end, and each of the linear projection of the arm end have a semicircular section which becomes taller toward the end.

BRIEF DESCRIPTION OF THE DRAWINGS

The present invention will now be described in detail with reference to the accompanying drawings, in which.

DETAILED DESCRIPTION OF PREFERRED EMBODIMENT

Figure 1:
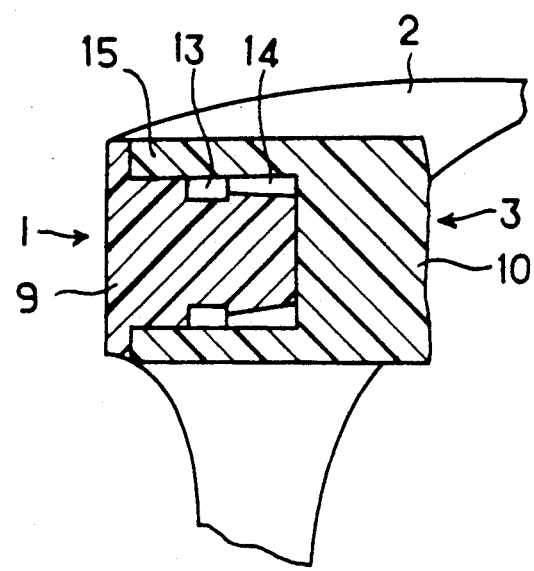
FIG. 1 is a sectional view of the connection between a lens frame and an arm in accordance with the present invention.

Spectacles have two connections between lens frames 2 and arms 3. In the following description, however, only one of the two connection is illustrated and described, the other connection having the same construction.

The connection of the spectacles in accordance with the present invention comprises a frame corner 1 between a top frame 2 and a rim, on one hand, and an arm end 10 of an arm 3 engagable therewith, on the other hand. Both the frame corner 1 and the arm end 10 are made of synthetic plastic, for example, polycarbonate.

Figure 2:
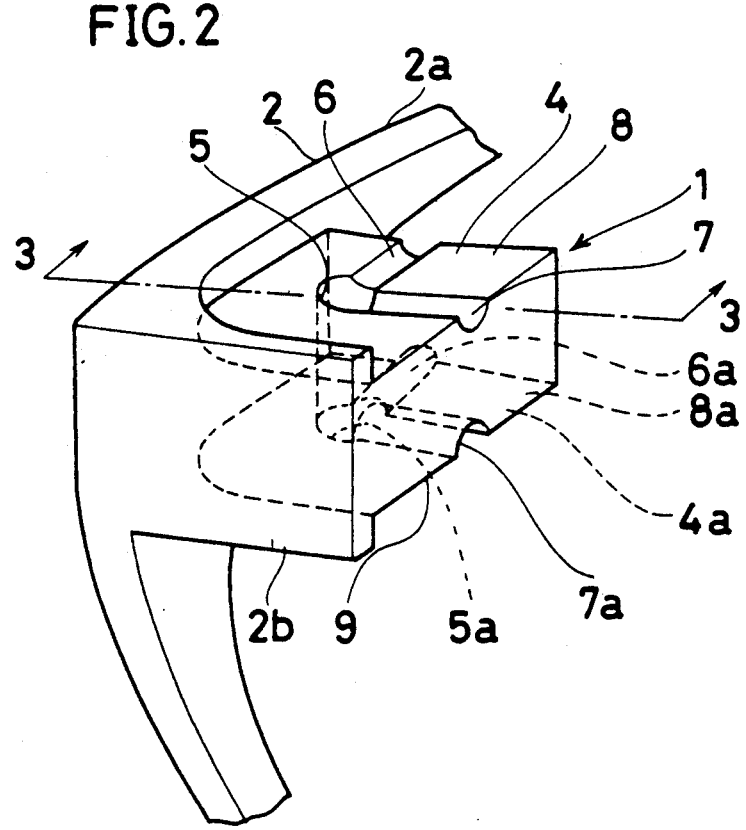
FIG. 2 is a perspective view of the connection portion of an lens frame in accordance with the present invention.
Figure 3:
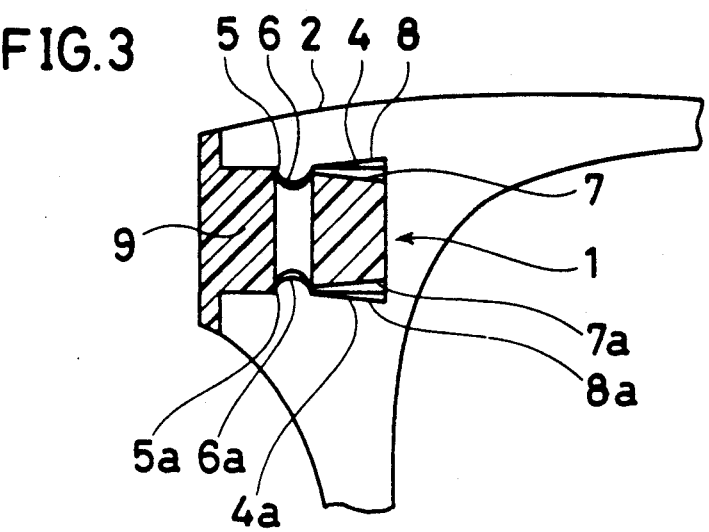
FIG. 3 is a section taken along the line 3—3 in FIG. 2.

The frame corner 1 is shown in FIGS. 2 and 3. The frame corner 1 includes a substantially rectangular parallelepiped block 9, which extends integrally from a long front frame 2a and a short side frame 2b of the top frame 2. The only free corners 8, 8a of the block 9 are a little thickened compared with the flat top and bottom surfaces 4, 4a of the block 9, as clearly shown in FIG. 3.

The block 9 has a hole 5 which penetrates between the top and bottom surfaces 4, 4a of the block 9 as shown in FIG. 2 and FIG. 3.

From each open end of the hole 5 extends a groove 6, 6a in the top and bottom surfaces 4, 4a of the block, respectively, in parallel with the top front frame 2a. Each groove 6, 6a has a semicircular section which becomes deeper toward the open end.

From each open end of the hole 5 and at right angle with the grooves 6, 6a extends another groove 7, 7a in the top and bottom surfaces 4, 4a. Each groove 7, 7a has a semi-circular section which becomes deeper toward the open end.

Figure 4:
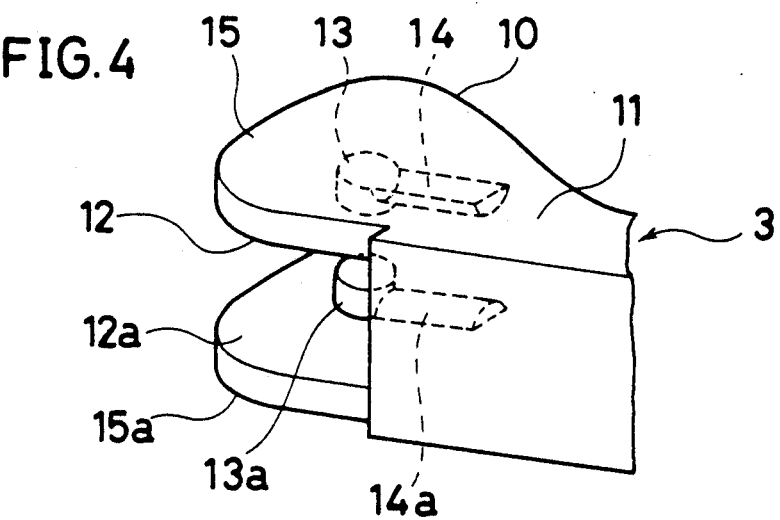
FIG. 4 is a perspective view of the connection portion of an arm in accordance with the present invention.
Figure 5:
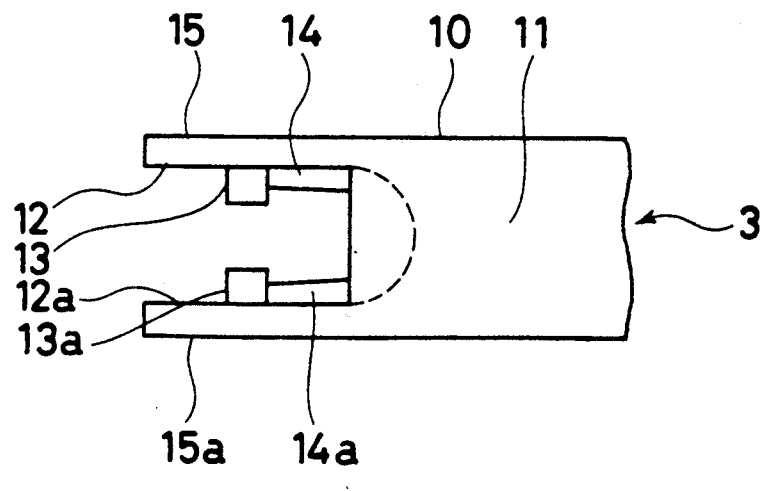
FIG. 5 is a side view of the same part as FIG. 4.

The arm end 10 is shown in FIGS. 4 and 5. The arm end 10 includes a pair of parallel planar strips 15, 15a extending integrally from the base 11 of the arm 3. The distance between the upper strip 15 and the lower strip 15a is such that it allows the insertion of the rectangle block 9 of the frame corner 1.

Each of the strips 15, 15a has a cylindrical projection 13, 13a facing each other which, in use, can be inserted into the hole 5 of the block 9.

From each cylindrical projection 13, 13a, extends a linear projection 14, 14a of semicircular section in the direction of the arm 3, which section becomes taller toward the end. When in use, the linear projections 14, 14a can be neatly inserted into one of the grooves 6, 6a and 7, 7a. The length of the linear projections 14, 14a is therefore the same as that of the grooves 6, 6a, 7, 7a of the block 9.

As apparent from the above description, the frame corner 1 and the arm end 10 are combined by forcibly inserting the block 9 of the frame corner 1 into the parallel strips 15, 15a of the arm end 10. When inserted, the distance between the strips 15, 15a widens temporarily due to the elasticity of the plastic material and the grooves 6, 6a and 7, 7a of the block 9 helps smooth insertion of the block 9. Finally, the cylindrical projections 13, 13a are pivotally fixed into the hole 5 of the block 9.

When the linear projections 14, 14a are put into the grooves 7, 7a of the block 9, that is the "use" position and when the linear projections 14, 14a are put into the grooves 6, 6a of the block 9, that is the "non-use" position. The arm 3 is pivotally movable in the range of 90 degrees as usual spectacles, but only at the positions of "use" and "non-use", it is securely positioned due to the engagement of a pair of grooves with the linear projections 14, 14a. The thickened portion 8, 8a of the block 9 prevents the connected elements from moving out of the engagement.

Thus, in accordance with the present invention, the arm does not move accidentally and at the same time, the precise positional relationship can be maintained.

While the embodiment of the present invention, as herein described, constitutes a preferred form, it will be appreciated that modification may be made in the invention. For example, the hole 5 may be replaced by a pair of comparatively deep recesses extending from the top and bottom surfaces 4, 4a of the block 9, respectively. The block 9 may not be integrally molded with the top frame 2 but may be attached by welding etc. The cylindrical projections 13, 13a and linear projections 14, 14a may also be attached to the parallel strips 15, 15a by welding etc.

We claim:

1. Spectacles including lens frames and two arms pivotally connected to the lens frames comprising:

a lens frame corner including a substantially parallelepiped block extending from the lens frame and having a top and a bottom surfaces, each of the top and bottom surfaces of said block having a recess or a hole, a first groove having a substantially semicircular section, and a second groove having a substantially semicircular section at right angle with the first grooves, and, an arm end including a pair of parallel planar strips, the distance between the upper strip and the lower strip being such that it allows insertion of the block of the frame corner, each of the strip having a substantially cylindrical projection facing each other which, in use, is inserted into the recess or the hole of the block and a linear projection having a substantially semicircular section, which, in use, is inserted into one of the grooves of the block.

2. Spectacles according to claim 1, wherein the parallelepiped block has outer corners which are thickened compared with the flat top and bottom surfaces.

3. Spectacles according to claim 1 wherein each of the first and second grooves have a semicircular section which becomes deeper toward the end, and each of the linear projection of the arm end have a semicircular section which becomes taller toward the end.

* * * * *